Nov. 3, 1953  J. FAUST  2,657,429
INJECTION MOLDING MACHINE
Filed Dec. 22, 1948  3 Sheets-Sheet 1

INVENTOR
JACOB FAUST
BY
AGENT

Nov. 3, 1953  J. FAUST  2,657,429
INJECTION MOLDING MACHINE
Filed Dec. 22, 1948  3 Sheets-Sheet 2
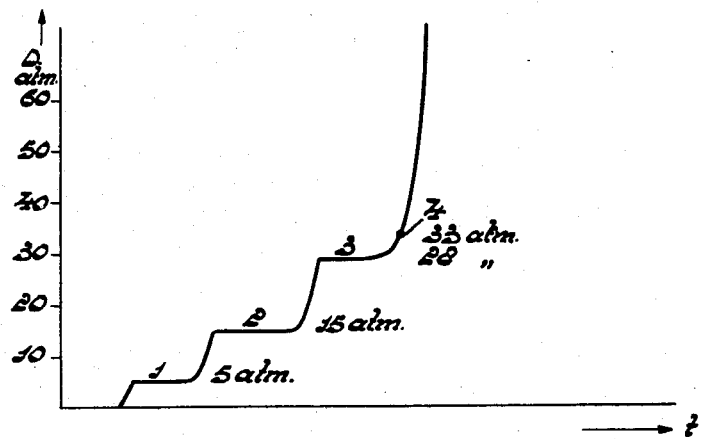
Fig. 2
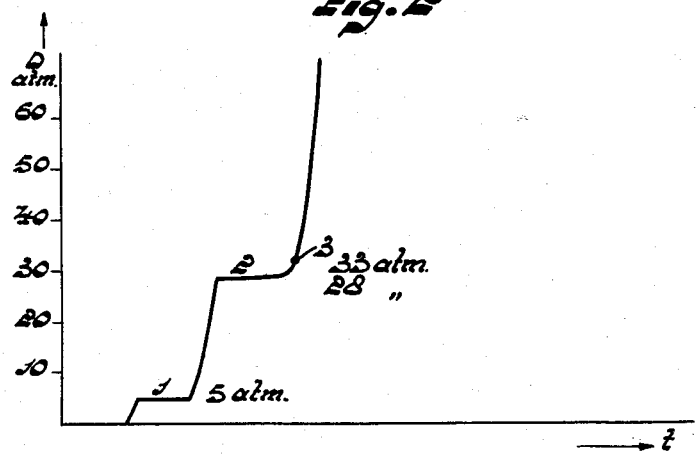
Fig. 2¼
INVENTOR
JACOB FAUST
BY *[signature]*
AGENT Nov. 3, 1953   J. FAUST   2,657,429
INJECTION MOLDING MACHINE
Filed Dec. 22, 1948   3 Sheets-Sheet 3

INVENTOR
JACOB FAUST
BY *Fred M Vogel*
AGENT

Patented Nov. 3, 1953

2,657,429

UNITED STATES PATENT OFFICE 2,657,429

INJECTION MOLDING MACHINE

Jacob Faust, Eindhoven, Netherlands, assignor to Hartford National Bank and Trust Company, Hartford, Conn., as trustee Application December 22, 1948, Serial No. 66,684
Claims priority, application Netherlands
January 13, 1948

6 Claims. (Cl. 18—30)

This invention relates to devices for moving a mould and for moulding with the same.

According to the invention, the device comprises at least two movable parts, of which one part comprises a moulding member and another serves for moulding; this device preferably comprises three pressure systems of relatively different pressures, the movement of the parts and/or the moulding with the said parts being performed by means of the pressures of the systems, each of the movable parts being subject to a force which is continuously active and to a variable force which is active in a sense opposite to the former and is produced by successive connection of at least two of the said three pressure systems, the variable force causing the movable part comprising one moulding member to move in the direction of working so that the mould is closed and, furthermore, the pressure systems of the movable parts being coupled with one another, the variable force produced by the pressure of that pressure system, the pressure of which is comprised between the pressures of the other two pressure systems causing the movable part serving for moulding by a suitable choice of the forces acting upon this part in relatively opposite directions, to move in the direction of working only when the mould has been closed with a predetermined force. After moulding the variable force is again caused to act upon the movable parts by connection to the pressure system having the lowest value. These parts return to their initial positions under the action of the continuously active force.

In the known devices the movements of the movable parts are, as a rule, independent of one another, the movements being controlled by means of individual valves, which detracts from the economic operation of the mould. In certain cases the movements of the movable parts are coupled by means of electric couplings, in which event a separate motor and pump may be provided for each of the movable parts, thus rendering this construction highly complicated and expensive.

From a structural point of view it is preferable that the force which continuously acts upon one or both movable parts should be taken from the pressure system having the highest pressure value, which pressure system is already provided for moving the mould.

A simple construction for moving the movable parts is obtained if one or more of the movable parts is coupled with a double-action piston movable in a cylinder and exhibiting working surfaces of different size, the pressure of the pressure system having the highest value being active upon the smaller surface, whereas the pressures of the three pressure systems with progressive values being successively active upon the larger surface.

The present invention may also be successfully used if the mould comprises three movable parts which comprise a table supporting one moulding member, a container filled with the material to be injected, and an injection plunger respectively, the second and the third part each being coupled with a separate double-action piston system with associated cylinder or cylinders and each piston system having working surfaces of different size. At first the second movable part and then the third movable part are moved in the direction of working by a suitable choice of the ratios between the working surfaces of each piston system.

In order to render the moulding operation automatic, it is important that changing-over from the pressure of the system the pressure of which is comprised between the pressures of the other two pressure systems, to the pressure of the system having the highest pressure should be performed by means of a change-over mechanism which has a surface subject to a force produced by a variable pressure from the pressure system having a pressure comprised between the pressures of the other two pressure systems and also a surface subject to a continuously active force. The ratio between the aforesaid forces being chosen to be such that the change-over mechanism is actuated by means of the pressure of the first-mentioned pressure system when this pressure has substantially attained its maximum value, whereas, when after moulding the variable pressure drops below a certain value, the change-over mechanism is switched back into its initial position by means of said continuously active force.

The use of the change-over mechanism permits the mould to be operated with one grip.

With the device according to the present invention the succession of the movements is carried out entirely automatically by the choice of suitable ratios between the variable and continuously active forces, whilst during the injection of the material the required closing pressure of the mould is always provided.

In order that the invention may be more clearly understood and readily carried into effect, it will now be described more fully with reference to the accompanying drawings, which show, by way of example, two embodiments of moulds comprising the device according to the invention.

Figs. 1 and 1A show a mould injecting liquid material, referred to as an injection mould, in which three movable parts are successively moved in the direction of working.

In Fig. 2 a graph indicates the theoretical pressure variation during the movement and the moulding operation.

Fig. 4 shows the pressure variation during the movement and the moulding operation of this mould.

Figure 1A:
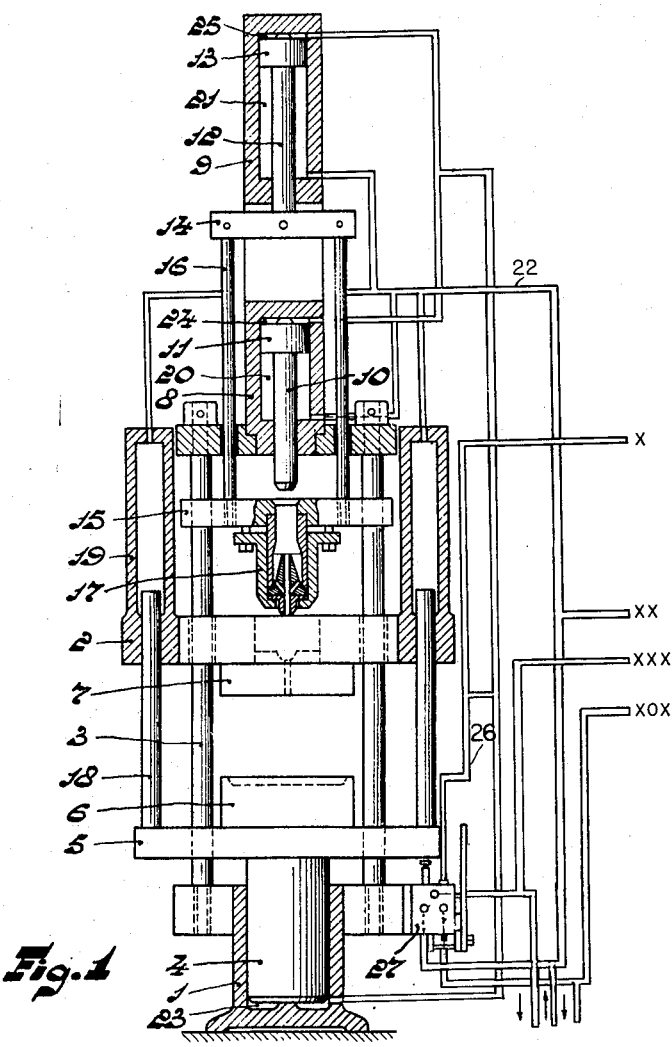
Figure 1A:
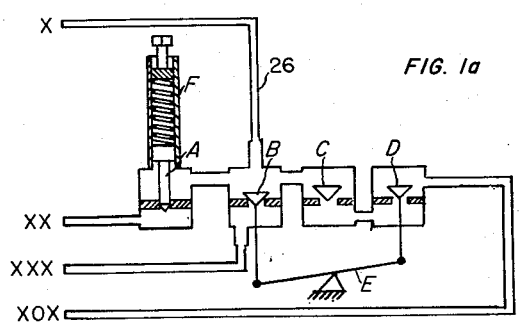

The injection mould shown in Fig. 1 comprises a lower frame 1, to which an upper frame 2 is secured by means of columns 3. Within the lower frame 1 is a movable part 4, the mould plunger, which comprises a table 5, to which the lower moulding member 6 may be secured. An upper moulding member 7 is secured to the upper frame 2, two cylinders 8 and 9 being secured to the frame by means of the columns 3. A second movable part 10, the injection plunger, is adapted to move in the cylinder 8 and comprises, at its extremity, a double-action piston 11, and a third movable part 12 is adapted to move in the cylinder 9 and likewise comprises a double-action piston 13, to which a container 17 is secured by means of yokes 14, 15 and rods 16. The container 17 may contain molten material which is to be injected. The table 5 has secured to it two plungers 18, which are adapted to move in cylinders 19 of the frame 2.

The space 20 below the double-action piston 11, the space 21 below the double-action piston 13, and the cylinders 19 communicate through a conduit 22 with the pressure system of the highest value, which is, for example, 200 atms. and will be referred to as the high pressure.

The space 23 below the moulding plunger, the space 24 above the double-action piston 11, and the space 25 above the double-action piston 13 communicate through a conduit 26 with a valve casing 27. Fig. 1A shows a diagram of the valve casing 27, the corresponding communications being indicated by the conduit lines.

The device operates as follows:

By opening a valve D (Fig. 1A) by means of a lever E, so that valve B is simultaneously closed, the pressure of the second pressure system, which is, for example, 35 atms. (medium pressure) is transferred through the conduit 26 to the spaces 23, 24 and 25, thus increasing the pressure in the said spaces. As soon as the pressure in the space 23 has become high enough to move the plunger in the direction of working, for example at 5 atms., the mould is closed. During the period in which the moulding plunger moves in the direction of working, the pressure remains substantially constant. After the mould has been closed, the pressure in the spaces 23, 24 and 25 increases further. When the pressure has reached a given value, for example 15 atms., a suitable choice of the ratio between the circular surface and the annular surface of the double-action piston 13 ensures that the force exerted on the circular surface exceeds the force exerted on the annular surface. The movable part 12 which has secured to it the container 17 filled with liquid material to be injected then moves in the direction of working. During this period the pressure remains substantially unchanged. When the movable part has been moved into the position at which it engages the upper moulding member 7, the pressure increases further. When the pressure has attained a value of, for example 28 atms., a suitable choice of the ratio between the circular surface and the annular surface of the double-action piston 11 ensures that the force exerted on the circular surface exceeds the force exerted on the annular surface with the result that the injection plunger is moved in the direction of working. When the injection plunger engages the material in container 17, the pressure in the conduit system will increase further. When this pressure has reached the value of, for example, 33 atms., the force of the high pressure under the valve A and the force of the low pressure are jointly sufficient to open the valve A against the pressure of a spring F, so that the entire conduit system is put under high pressure, whereupon the material is injected. When the conduit system is put under high pressure, a non-return valve C closes, so that the high pressure cannot propagate into the medium pressure source.

When the moulding operation has ended, changing-over of the lever E causes the valve D to be closed and the valve B to be opened, with the result that the conduit system communicates with the pressure system of the lowest value (the low pressure, which is, for example, 0 atm.). Owing to the drop in pressure, the valve A closes under the action of the spring F. The pressures in the spaces 23, 24 and 25 drop to the value of the low pressure. Under the action of the high pressure prevailing in the cylinders 19 and in the spaces 20 and 21 the movable parts are moved into their initial positions in the reverse sequence.

Fig. 2 shows the pressure variation in the conduit system during the movement of the parts in the direction of working. The time is plotted on the horizontal axis and the various pressures occurring are plotted on the vertical axis. The portion 1 represents the period during which the mould table moves, 2 the period of movement of the movable part to which the container is secured, 3 the period during which the injection plunger moves, and 4 the point at which change-over from medium pressure to high pressure takes place.

Although in this mould use is made of three different pressure systems with the purpose of carrying out the movement of the movable parts by means of a medium of comparatively low pressure and the moulding operation by means of a medium of high pressure, which medium is materially more expensive, it may yet occur that these moulds comprise only two pressure systems. For moving in succession the movable part to which the container and the injection plunger is secured, it is only necessary that the ratio between the forces exerted on the double-action pistons should be suitably chosen.

Figure 3:
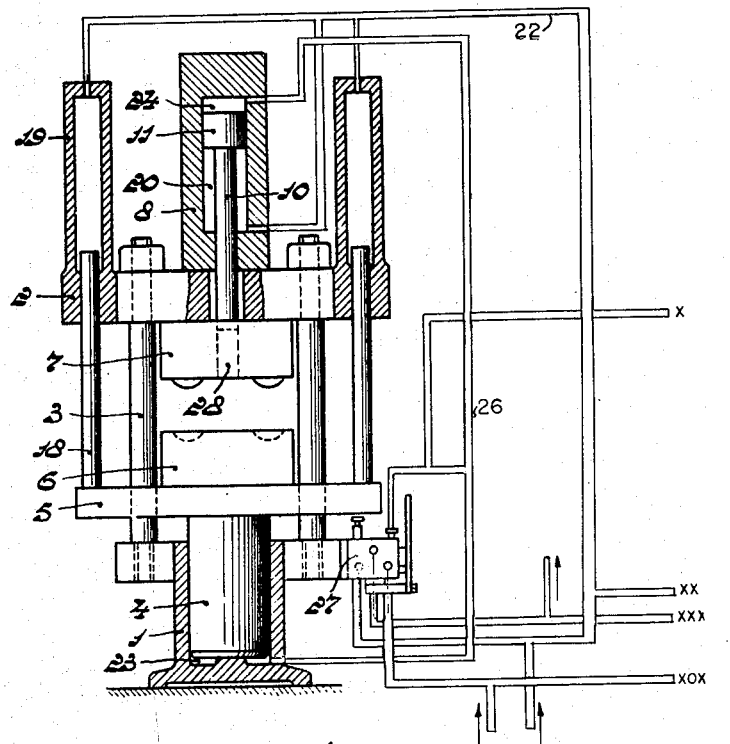
Figs. 3 and 3A show a synthetic-resin mould injecting a dosed amount of material, referred to as a transfer mould, which comprises two movable parts.
Figure 3A:
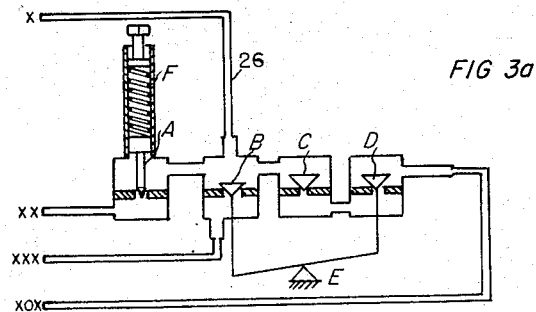

A further embodiment is given in Fig. 3, which shows a transfer mould. The reference numerals correspond to those of Fig. 1.

When the valve D is opened by changing-over the lever E, whereby valve B is closed, the conduit 26 communicates with the medium pressure source. Thus, the spaces 23 and 24 are also caused to communicate with the medium pressure source.

When the pressure in 23 has attained a certain value, for example 5 atms., the mould table is moved in the direction of closing of the mould;

during this time the pressure in the conduit system remains substantially constant; as soon as the mould has been closed, the pressure increases further. When the pressure has attained a value of, for example, 28 atms., the force exerted on the circular surface of the double-action piston 11 is sufficient to overcome the force exerted on the annular surface of this piston, so that the movable part, the injection plunger, is moved in the direction of working. In the space 28 a tablet of the material to be injected is provided on the lower moulding member. When the injection plunger engages this tablet, the pressure in the conduit system increases further. When it has attained a determined value, for example 33 atms., the high pressure is automatically switched-on in the manner as described for the injection mould, whereupon the material is injected.

Fig. 4 shows in a graph similar to that of Fig. 2, the pressure variation in the conduit system of this mould during the movement of the movable parts in the direction of working. Here 1 designates the period during which the mould table moves, 2 the period during which the injection plunger moves, and 3 the point at which changeover from medium pressure to high pressure takes place.

Although in the two embodiments the movable parts each comprise a double-action piston having surfaces of unequal size, it is, as an alternative, possible to make the movable parts co-operate in a different manner with surfaces of unequal size, for example by means of a yoke having two plungers of unequal size which are positioned diametrically, or by means of other similar constructions. In contradistinction to the embodiments described hereinbefore, in which the movable parts move in opposite directions, constructions in which they move in the same direction are also possible.

Instead of the embodiments above described, constructions are conceivable in which the continuously active force is exerted, for example, by a spring or a weight; the forces exerted on a movable part having to be suitably proportioned. The present invention may be successfully applied to moulds used for various purposes, for example to moulds for moulding objects of metal, thermosetting and thermoplastic materials.

The moulds above described may be positioned either horizontally or vertically.

What I claim is:

1. Molding apparatus comprising a first molding member, a second molding member movable with respect to said first molding member, an extrusion member engaging one of said molding members and movable relative to said first molding member, means to apply a continuous force to said movable mold member and said extrusion member to position said first and second molding members and said extrusion member in spaced apart relationship, first and second force sources, means to apply force from said first force source to successively actuate said second molding member and said extrusion member against the action of said continuous force to thereby successively engage said first and second molding members and one of said molding members and said extrusion member, and means responsive to the intensity of the force from said first source applied to said second molding member and to said extrusion member to apply the force from said second source to said second molding member and to said extrusion member.

2. Molding apparatus comprising a first molding member, a second molding member movable with respect to said first molding member, an extrusion member engaging said first molding member and movable relative to said first molding member, first and second pressure sources, means to apply a continuous force to said movable mold member and said extrusion member to position said first and second molding members and said extrusion member in spaced apart relationship, said means comprising piston elements coupled to said second molding member and to said extrusion member and to said first pressure source, means to successively actuate said second molding member and said extrusion member against the action of said continuous force to thereby successively engage said first and second molding members and said first molding member and said extrusion member, said latter means comprising second piston elements coupled to said second molding member and to said extrusion member and to said second pressure source, and means responsive to the pressure of said second source at said second piston elements to apply said first pressure source to said second piston elements.

3. Molding apparatus comprising a first molding member, a second molding member movable with respect to said first molding member, an extrusion member engaging said first molding member and movable relative to said first molding member, a first pressure source of given intensity, a second pressure source having an intensity less than said given intensity, means to apply a continuous force to said movable mold member and said extrusion member to position said first and second molding members and said extrusion member in spaced apart relationship, said means comprising a pair of operatively connected plungers coupled to said second molding member and a double acting piston member coupled to said extrusion member, said piston member having a first active surface of given size and a second active surface greater than said given size, means to couple said first pressure source to said first active surface of said piston member, means to successively actuate said second molding member and said extrusion member against the action of said continuous force to thereby successively engage said first and second molding members and said first molding member and said extrusion member, said latter means comprising means to couple said second pressure source to the said second active surface of said piston member, and means responsive to the pressure against the said second active surface of said piston member to apply pressure from said first source to the said second active surface of said piston member.

4. Molding apparatus comprising a base member, a first molding member secured to said base member, a second molding member supported by said base member and movable with respect to said first molding member, an extrusion member comprising a container and an injection plunger, said container and said injection plunger being supported by said base member and being movable with respect to said first molding member, a first pressure source of given intensity, a second pressure source having an intensity less than said given intensity, a pair of operatively connected plungers coupled to said second molding member, a double acting piston member coupled to said container, a second double acting piston member coupled to said injection plunger, said first and second piston members having respectively a first active surface of given size and a second active surface greater than said given size, means to couple said first pressure source to the said first active surface of said piston members and to said plungers to thereby position said first and second molding members, said container and said injection plunger in spaced apart relationship, means to successively actuate said second molding member, said container and said injection plunger to thereby successively engage said first and second molding members, said first molding member and said container and said injection plunger, said latter means comprising coupling members interconnecting said second pressure source and said second active surface of said piston members, and valve means responsive to the pressure against the said second active surface of said piston members to apply pressure from said first source to the said second active surface of said piston members.

5. Moulding apparatus comprising a stationary mould support; a movable mould support having piston means with a small working surface to move the support to open position and a large working surface to move the support to closed mould operating position; an injection material container having a movable support with piston means having a small working surface to move and support the container away from operating position and a large working surface to move the container to operating position; an injection plunger having piston operating means with a small working surface to move the plunger away from operating position and a large working surface to move the plunger to operating position; means for applying a continuous constant bias pressure to the small area surfaces of the three piston means to bias and to move those piston means and their associated elements away from operating position; and means for applying a working pressure to the large working areas of the piston means to temporarily overbalance the biasing pressures on the small working surfaces and to move the piston means and their associated elements to their respective operating positions.

6. Apparatus as in claim 5, including valve means initially manually movable to operating or to non-operating position and thereafter automatically operative to control the application of pressure forces to the several piston means to cause a predetermined cycle of operation of said means for one operating cycle of the apparatus.

JACOB FAUST.

References Cited in the file of this patent

UNITED STATES PATENTS

| Number | Name | Date |
|---|---|---|
| 1,994,974 | Wiedmann | Mar. 19, 1935 |
| 2,107,190 | Shaw | Feb. 1, 1938 |
| 2,259,781 | Shaw et al. | Oct. 21, 1941 |
| 2,293,334 | Ernst | Aug. 18, 1942 |
| 2,301,028 | Esch | Nov. 3, 1942 |
| 2,410,909 | Tucker | Nov. 12, 1946 |
| 2,480,313 | Alden | Aug. 30, 1949 |

FOREIGN PATENTS

| Number | Country | Date |
|---|---|---|
| 470,814 | Great Britain | Aug. 16, 1937 |
| 889,751 | France | Oct. 11, 1943 |